United States Patent
Jeong et al.

(10) Patent No.: US 9,911,343 B2
(45) Date of Patent: Mar. 6, 2018

(54) INTEGRATED LANDING RECEIVER FOR AN AIRCRAFT LANDING AND CONTROLLING METHOD THEREOF

(71) Applicant: KOREA AEROSPACE RESEARCH INSTITUTE, Daejeon (KR)

(72) Inventors: Myeong-Sook Jeong, Daejeon (KR); Hyang-Sig Jun, Daejeon (KR); Joong-Won Bae, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 5 days.

(21) Appl. No.: 15/029,260

(22) PCT Filed: Jul. 24, 2015

(86) PCT No.: PCT/KR2015/007702
§ 371 (c)(1),
(2) Date: Apr. 14, 2016

(87) PCT Pub. No.: WO2016/068452
PCT Pub. Date: May 6, 2016

(65) Prior Publication Data
US 2016/0328982 A1    Nov. 10, 2016

(30) Foreign Application Priority Data
Oct. 31, 2014    (KR) .................... 10-2014-0149923

(51) Int. Cl.
*G08G 5/02*    (2006.01)
*B64F 1/18*    (2006.01)
(Continued)

(52) U.S. Cl.
CPC ............ *G08G 5/025* (2013.01); *B64D 45/04* (2013.01); *B64F 1/18* (2013.01); *G01S 19/15* (2013.01);
(Continued)

(58) Field of Classification Search
CPC ............ G08G 5/025; B64D 45/04; B64F 1/18; G01S 19/39
See application file for complete search history.

(56) References Cited

U.S. PATENT DOCUMENTS 6,239,745 B1    5/2001    Stratton
7,447,590 B2    11/2008   Arethens
(Continued)

FOREIGN PATENT DOCUMENTS

EP    2511733 A2    10/2012
JP    11-345399 A   12/1999
(Continued)

*Primary Examiner* — Alex C Dunn
(74) *Attorney, Agent, or Firm* — Rabin & Berdo, P.C.

(57) ABSTRACT

An integrated landing receiver for landing of an aircraft and a controlling method thereof are provided, in which the integrated landing receiver includes a receiver including a plurality of signal information processors that generate landing guidance information respectively corresponding to a plurality of landing support facilities, a collector collecting the landing guidance information respectively generated at the plurality of signal information processors, and an integrator generating integrated landing guidance information by using the landing guidance information collected at the collector and outputting the result. Accordingly, when a plurality of landing support facilities are installed together at an airport, the landing guidance information provided from these landing support facilities are mixed and provided so that shortcomings that each landing supporting facility may have can be advantageously compensated, thus enabling safe and effective provision of the landing guidance information.

9 Claims, 6 Drawing Sheets

(51) Int. Cl.
*B64D 45/04* (2006.01)
*G01S 19/15* (2010.01)
*G08G 5/00* (2006.01)
*G01S 19/48* (2010.01)

(52) U.S. Cl.
CPC ............ *G01S 19/48* (2013.01); *G08G 5/0021* (2013.01); *G08G 5/0026* (2013.01)

(56) References Cited

U.S. PATENT DOCUMENTS

| | | | |
|---|---|---|---|
| 8,489,261 B2 | 7/2013 | Albert et al. | |
| 9,159,241 B1* | 10/2015 | Murphy | G08G 5/02 |
| 2004/0199304 A1* | 10/2004 | Tatham | G05D 1/0676 |
| | | | 701/16 |
| 2008/0172149 A1* | 7/2008 | Rouquette | G01C 21/00 |
| | | | 701/16 |
| 2011/0282580 A1* | 11/2011 | Mohan | G01C 21/005 |
| | | | 701/472 |
| 2013/0079958 A1* | 3/2013 | Neri | G01S 19/15 |
| | | | 701/16 |
| 2015/0019051 A1* | 1/2015 | Malaga | G08G 5/02 |
| | | | 701/17 |
| 2015/0081143 A1* | 3/2015 | Snow | G08G 5/025 |
| | | | 701/16 |
| 2015/0239577 A1* | 8/2015 | Lowe | B64F 1/00 |
| | | | 244/114 R |
| 2015/0362598 A1* | 12/2015 | Rollet | G01S 19/15 |
| | | | 701/17 |

FOREIGN PATENT DOCUMENTS

| | | |
|---|---|---|
| KR | 10-0912927 B1 | 8/2009 |
| KR | 10-1398382 B1 | 5/2014 |

\* cited by examiner

INTEGRATED LANDING RECEIVER FOR AN AIRCRAFT LANDING AND CONTROLLING METHOD THEREOF

TECHNICAL FIELD

The present disclosure relates to an integrated landing receiver for an aircraft landing and a controlling method thereof, and more particularly, to an integrated landing receiver for an aircraft landing and a controlling method thereof which can provide integrated landing guidance information that mixes landing guidance information provided by a plurality of landing support facilities.

BACKGROUND ART

FIG. 1 is a view provided to explain an approach route of an aircraft.

An aircraft has to navigate along a predetermined approach route, while maintaining a predetermined glide angle along a centerline of a runway as illustrated in FIG. 1 to land on the runway safely, and an aircraft landing support facility aids the aircraft to do so. The example of the aircraft landing support facility includes the Instrument Landing System (ILS), the Ground-based Augmentation System (GBAS), the Microwave Landing System (MLS), and so on.

The ground equipment of each of these systems is installed at airport and radiates predetermined signals so that a receiver mounted on an aircraft approaching the airport receives the signals and generates landing guidance information to guide runway approach and landing by referring to the received signals. The generated landing guidance information is provided to a pilot through the aircraft instrument such as the course deviation indicator (CDI) or the primary flight display (PFD), and so on, and the pilot refers to such information as he or she conducts safe runway landing flight.

The ILS has been in use from the 1050. As a landing support facility that has been used for the longest time, the ILS provides guaranteed reliability, and most of the world's airports are using the ILS as the landing support facility. Meanwhile, the ILS has decreased accuracy in the landing guidance information (i.e., lateral and vertical deviation information) than those provided by GBAS or MLS, and also has a disadvantage of increased cost as it requires that equipment be installed per runway to provide the landing guidance information.

The MLS has been installed and used at some airports in the 1990, but has not been installed and operated actively on a global scale. Among the three landing support facility (i.e., ILS, GBAS, MLS), MLS provides the second-greatest accuracy of the landing guidance information, and has the advantage of being operated independently without being influenced by jamming. However, a few airports installed MLS, and like the case of ILS, MLS also has the shortcoming of low economic feasibility as it requires equipment be installed per runway.

The GBAS has been installed and operated since 2009 in countries including Germany, United States, Australia, Spain, and so on, and its supply is currently increased worldwide. Among the three landing support facilities, the GBAS provides the greatest accuracy of the landing guidance information, and is also economic as it can provide landing guidance information about the entire runways in the airport with only one GBAS ground equipment installed at the airport. Possibly the only shortcoming of the GBAS would be associated with the use of GPS signals, since when GPS signals have jamming, then it may not be possible to use the GBAS. Except for the jamming, the GBAS provides far greater accuracy of the landing guidance information, and thus, more and more airports around the world that installed ILS are currently installing the GBAS additionally, and there is an increasing number of airports in the world that install both ILS and GBAS.

The methods and principles of respective systems for generating landing guidance information vary. However, there are mainly three common things in receiving signals from respective systems at a receiver mounted on an aircraft and finally generating the landing guidance information.

FIG. 2 is a view provided to explain landing support information of an aircraft.

Referring to FIG. 2, the 'lateral deviation' refers to a degree of deviation of an aircraft from a centerline of a runway to the left/right. The ILS can provide the difference in depth of modulation (DDM), which is a unit expressing the lateral deviation as a difference in the depth of modulation of a radio wave, calculate the lateral deviation basically in a distance unit (i.e., meter), and can also transform into DDM unit and angular unit and provide the same. The MLS can basically calculate the lateral deviation in an angular unit (i.e., degree), and can also transform the lateral deviation expressed in the angular unit into DDM unit and provide the same.

The 'vertical deviation' refers to a degree of deviation of an aircraft above/below the Glide Path Angle (GPA). The unit of the vertical deviation provided by respective landing support facilities is same as the vertical deviation unit described above.

Both the GBAS and MLS can continuously provide 'distance to threshold', meaning distance between aircraft and runway threshold, in a length unit of a lateral distance between the aircraft and the runway threshold. The ILS can determine a distance between aircraft and runway threshold only when the aircraft passes the points where the marker beacons are installed, and this distance determination is only possible within approximately 8 km distance from runway threshold and for three times.

The conventional multi-mode receiver (MMR) is an aviation electronic equipment that generates landing guidance information and aircraft navigation information necessary for the aircraft to land on the runway, and MMR is mounted on the aircraft.

FIG. 3 is a view provided to explain a conventional MMR.

Referring to FIG. 3, the current large-scale civil aircrafts have the MMR of the structure illustrated in FIG. 3 mounted thereon to receive signals transmitted from the ground equipment of respective landing support facilities and generate landing guidance information, so that the generated information is provided to a pilot through the aircraft instrument (e.g., CDI, PFD, and so on).

Due to expensive cost of the aircraft landing supporting facilities, not every airport installs ILS, MLS and GBAS in view of economic aspect. Most airports basically install ILS, and certain (about 10) airports outside Korea install MLS on a trial basis, but use thereof was not extended and is almost died out. The GBAS, having far greater performance than ILS, has been installed from the 2009 in airports of many countries of the world (e.g., United States, Germany, Spain, Australia, Swiss, Korea, and so on), and approximately 40 airports of the world have completed installation or currently installing it. Among these, USA's Huston Airport, Newark Airport, Australia's Sydney Airport, Germany's Bremen Airport, Frankfurt Airport, and Spain's Malaga Airport are currently providing commercial services, and Korea has also installed GBAS at the Gimpo Airport and is operating it on a trial basis. Since the GBAS is installed on a trial basis at the airports having ILS already installed therein, these airports allow runway landing using ILS and also allow landing using GBAS. The airports installed with MLS can also allow aircrafts to conduct runway landing by using ILS and MLS, respectively.

Because most airports do not install all of the landing support facilities, a purchaser of the currently-available MMR can purchase desired processors as the options, by selecting from among the MLS processor 106, the ILS processor 107, and the GBAS processor 108 as exemplified in a receiver 105 of FIG. 3. Generally, the GNSS processor 109 in the receiver 109 is basically mounted.

The landing mode selector 110 receives from a flight management system (FMS) 111 the information on landing support facility to be used during landing of an aircraft, transmits an instruction to generate landing guidance information to one of the MLS processor 106, the ILS processor 107, and the GBAS processor 108, and receives the landing guidance information generated at a corresponding processor and transmits this back to the FMS 111.

When a pilot selects only the ILS processor 107 and the GBAS processor 108 through the FMS 111, the aircraft mounted with the corresponding MMR is able to land by using the corresponding landing support facility of the airport installed with the ILS or GBAS. Meanwhile, when only the ILS processor 107 and the MLS processor 106 are selected, the corresponding MMR is able to land only on the airport installed with the ILS or MLS.

Meanwhile, the conventional MMR includes all of the ILS processor 107, the GBAS processor 108, and the MLS processor 106 therein, and even when the airport is installed with all of the ILS, GBAS, and MLS, landing guidance information provided by only one landing support facility corresponding to the landing mode selected by the FMS 111 during aircraft landing is generated, and the generated information is provided to the aircraft instrument. That is, it is so designed that the pilots land by using only one landing support facility during runway landing.

Accordingly, when the GBAS ground equipment is out of order or when GPS jamming occurs while the aircraft attempting a runway landing with GBAS is about 10 NM (nautical mile) from runway threshold, the conventional MMR is not able to provide successive landing guidance information. Therefore, the aircraft is not able to land, but has to go around and then fly back to the initial approach fix which is about 20 NM away from the runway to make additional landing attempt. In this case, aircraft fuel consumption increases, and aircraft landing time is also delayed. Even if the pilot determines that the GBAS landing guidance information signals are lost and thus changes into ILS mode, about several seconds are necessary until ILS landing guidance information is outputted. Considering high velocity of an aircraft which can move a considerable distance even in a brief time, if the above-described circumstance occurs at a near distance to the runway, the aircraft will not be able to change mode, but has to go around and fly back.

DISCLOSURE OF INVENTION

Technical Problem

An object of the present disclosure is to solve the problems mentioned above, and accordingly, it is an object of the present disclosure to provide an integrated landing receiver and a controlling method thereof, which can provide integrated landing guidance information that mixes landing guidance information provided from each of a plurality of landing support facilities.

Solution to Problem

According to the present disclosure, an integrated landing receiver for landing of an aircraft is provided, which may include a receiver including a plurality of signal information processors configured to generate landing guidance information respectively corresponding to a plurality of landing support facilities, a collector configured to collect the landing guidance information respectively generated at the plurality of signal information processors, and an integrator configured to generate integrated landing guidance information by using the landing guidance information collected at the collector and output the result.

The integrator may include a validity determiner configured to determine validity of information including lateral deviation, vertical deviation, and distance between aircraft and runway threshold included in the landing guidance information respectively collected at the plurality of signal information processors, and a filter configured to output information including integrated lateral deviation, integrated vertical deviation, and integrated distance between aircraft and runway threshold, calculated by applying a weight according to the landing support facilities with respect to the information including the lateral deviation, the vertical deviation, and the distance between aircraft and runway threshold determined to be valid at the validity determiner.

The filter may output information including the integrated lateral deviation, the integrated vertical deviation, and the integrated distance between aircraft and runway threshold, calculated by applying the weight according to the landing support facilities with respect to the information including the lateral deviation, the vertical deviation, and the distance between aircraft and runway threshold determined to be valid, based on an equation below:

$$\text{Filtered\_out}(t) = wf \times \text{Low\_Accuracy\_input}(t) + (1-wf) \ast \text{High\_Accuracy\_input}(t) \qquad [\text{Equation}]$$

where, $wf = 1 - (L_{fs}/L_{max})$, $L_{max} = P_t + G_{tot} - R$, $P_t$: antenna output intensity of a ground equipment corresponding to Low_Accuracy_input (unit: dBm), $G_{tot}$: antenna gain of a ground equipment corresponding to Low_Accuracy_input (that is, antenna amplitude: dBm), R: receiver sensitivity (dBm) of an antenna provided at the integrated landing receiver that receives antenna signals from a ground equipment corresponding to Low_Accuracy_input (dBm), $L_{fs} = 32.45 + 20 \text{ Log}_{10}(d_{km}) + 20 \text{ Log}_{10}(f_{MHz})$.

$f_{MHz}$: antenna frequency of a ground equipment corresponding to Low_Accuracy_input, and $d_{km}$: distance between aircraft and runway threshold.

The Equation expresses processing two pieces of input information, i.e., Low_Accuracy_input and High_Accuracy_input with a weight (wf) and outputting (Filtered_out) the result, in which the 'Low_Accuracy_input' refers to input information that is evaluated to have less accuracy than 'High_Accuracy_input'. The plurality of landing support facilities comprise at least two of Instrument Landing System (ILS), Ground-based Augmentation System (GBAS), and Microwave Landing System (MLS), and the GBAS, MLS, and ILS are evaluated to have a higher accuracy in order and processed in such order, and when valid information is inputted from all of the GBAS, MLS, and ILS, the GBAS and ILS input information is first processed by the Equation above, and then the result of such processing and the MLS input information are again processed by the Equation above.

Further, the integrator may output the landing guidance information respectively generated at the plurality of signal information processors, and the information including the integrated lateral deviation, the integrated vertical deviation, and the integrated distance between aircraft and runway threshold together.

The plurality of signal information processors may include at least two of an ILS signal processor, a GBAS signal processor, and an MLS signal processor.

The collector may transform MLS lateral deviation and MLS vertical deviation included in the landing guidance information generated at the MLS signal processor into a DDM (difference in depth of modulation) unit and output the result.

According to an exemplary embodiment, a controlling method of the integrated landing receiver for landing of an aircraft is provided, which may include generating landing guidance information respectively corresponding to a plurality of landing support facilities, collecting the generated landing guidance information respectively corresponding to the plurality of landing support facilities, and generating integrated landing guidance information by using the collected landing guidance and outputting the result.

The generating the integrated landing guidance information and outputting the result may include determining validity of information including lateral deviation, vertical deviation, and distance between aircraft and runway threshold included in the collected landing guidance information, and outputting information including integrated lateral deviation, integrated vertical deviation, and integrated distance between aircraft and runway threshold, calculated by applying a weight according to the landing support facilities with respect to the information including the lateral deviation, the vertical deviation, and the distance between aircraft and runway threshold determined to be valid among the collected landing guidance information.

According to another exemplary embodiment, a computer-readable medium records a program to implement any of the methods described above on a computer.

Advantageous Effects of Invention

According to the present disclosure, when several landing support facilities are installed together at an airport, the landing guidance information provided from these landing support facilities are mixed and provided so that shortcomings that each landing supporting facility may have can be advantageously compensated, thus enabling safe and effective provision of the landing guidance information.

Further, according to exemplary embodiments of the present disclosure, in an airport where two or more landing support facilities are installed, when one of the landing support facilities is out of order, landing guidance information can be continuously generated using the information provided from the rest of the landing support facilities. Accordingly, issues such as loss of landing guidance information signals during runway approach for landing can be prevented, and advantages such as saving fuel and time from 'go around', and so on, can be provided.

MODE FOR THE INVENTION

Figure 1:
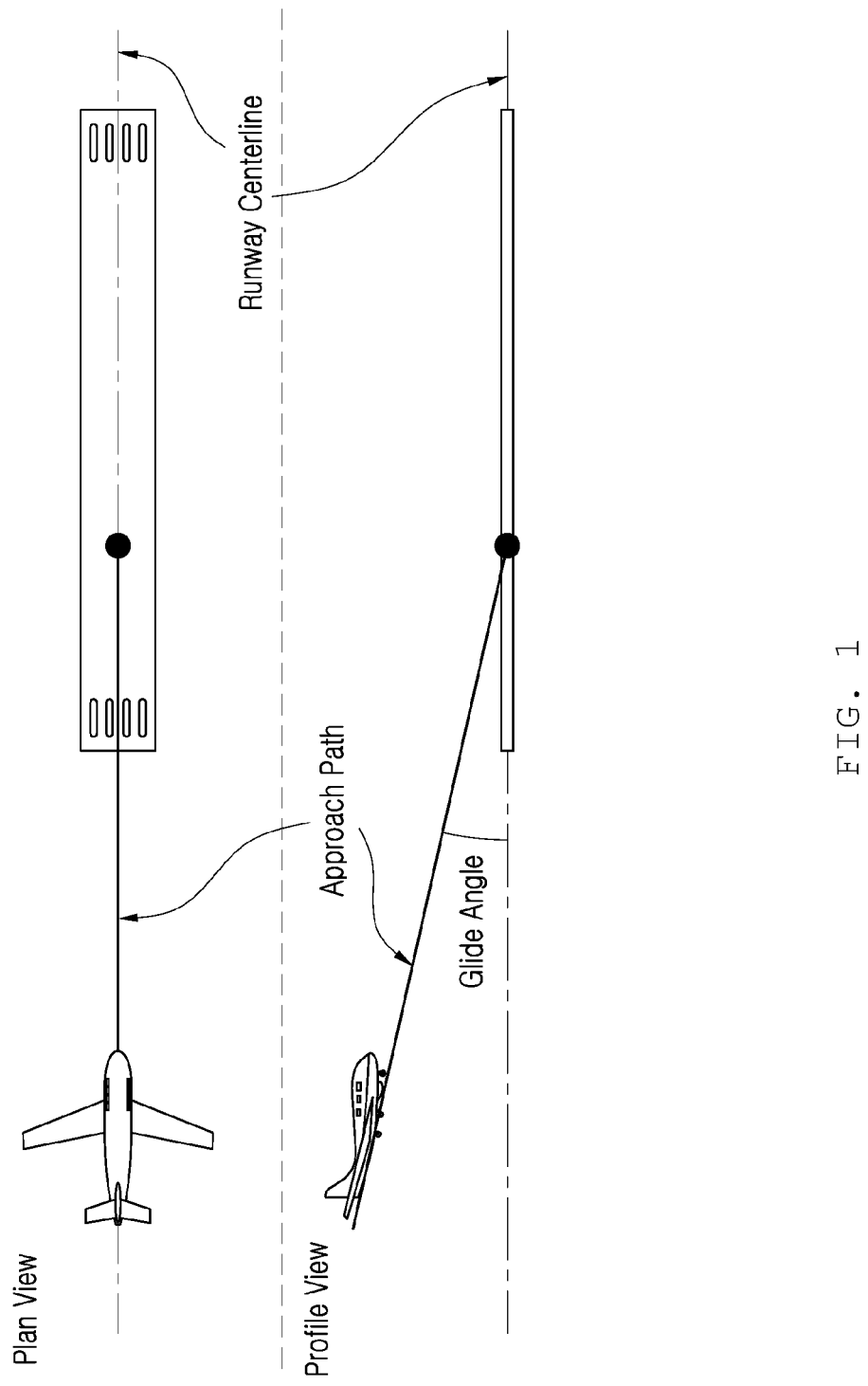
FIG. 1 is a view provided to explain an approach route of an aircraft.
Figure 2:
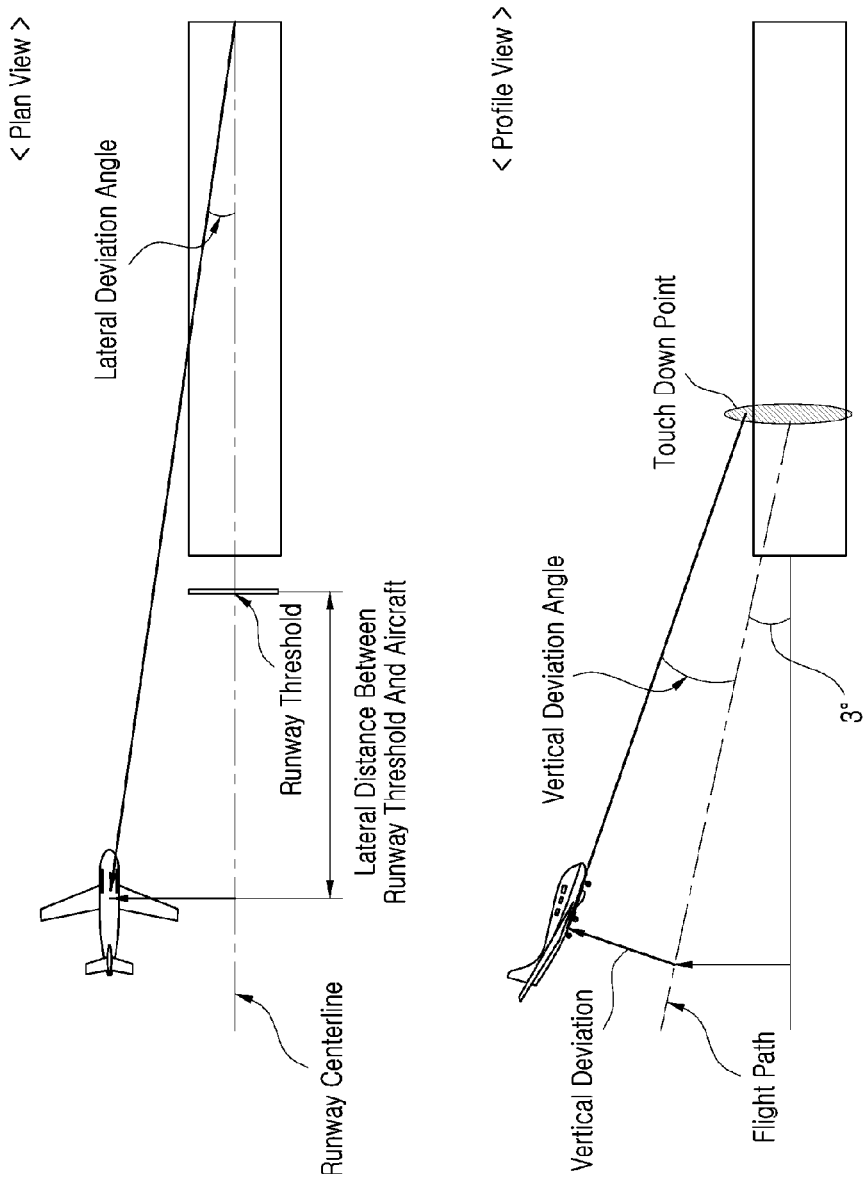
FIG. 2 is a view provided to explain landing support information of an aircraft.
Figure 3:
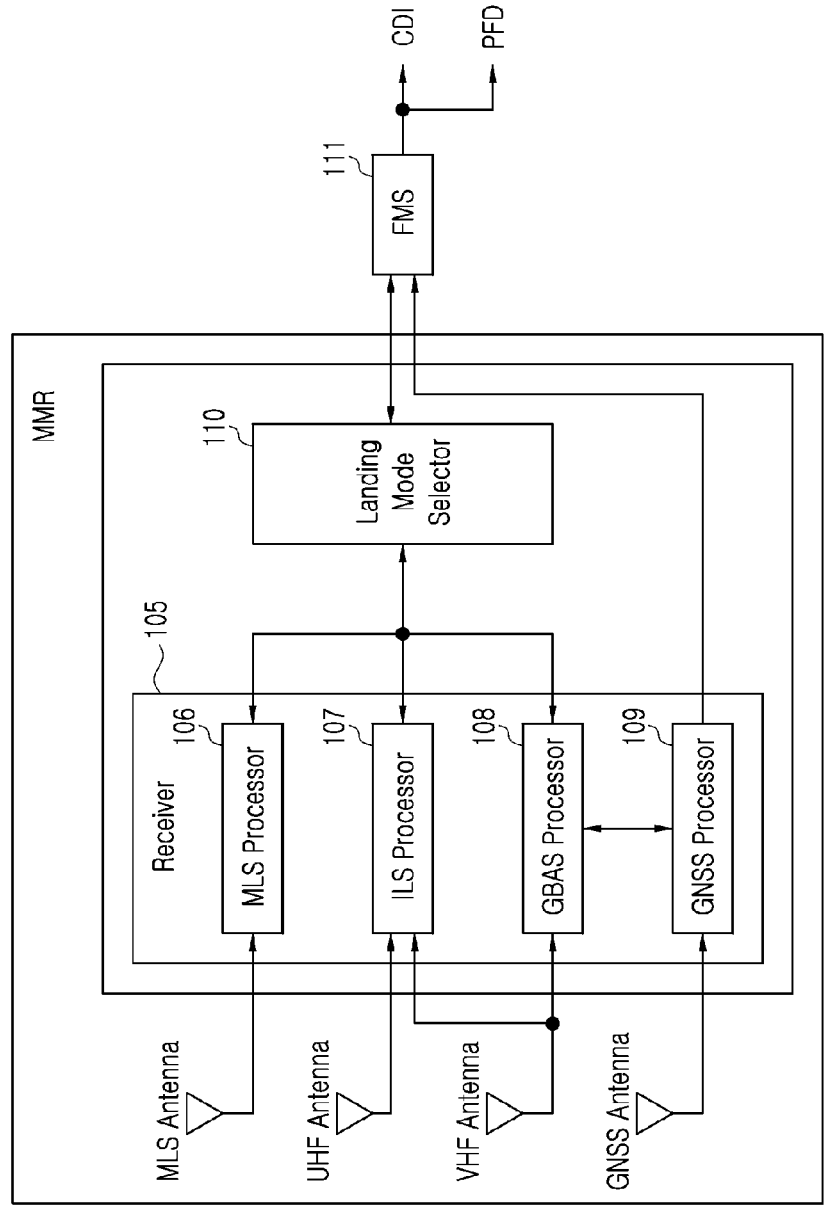
FIG. 3 is a view provided to explain a conventional multi-mode receiver (MMR).

Certain exemplary embodiments of the present inventive concept will be described in greater detail with reference to the accompanying drawings to enable those skilled in the art to work the present disclosure. However, it is not intended to limit the technology described herein to any specific embodiments, as it should be construed as encompassing various modifications, equivalents and/or alternatives of the embodiments. In the following description, issues irrelevant with the description are not described as these may obscure the description, and same drawing reference numerals are used for the same elements even in different drawings.

Certain exemplary embodiments of the present inventive concept will now be described in greater detail with reference to the accompanying drawings to enable those skilled in the art to work the present disclosure.

Figure 4:
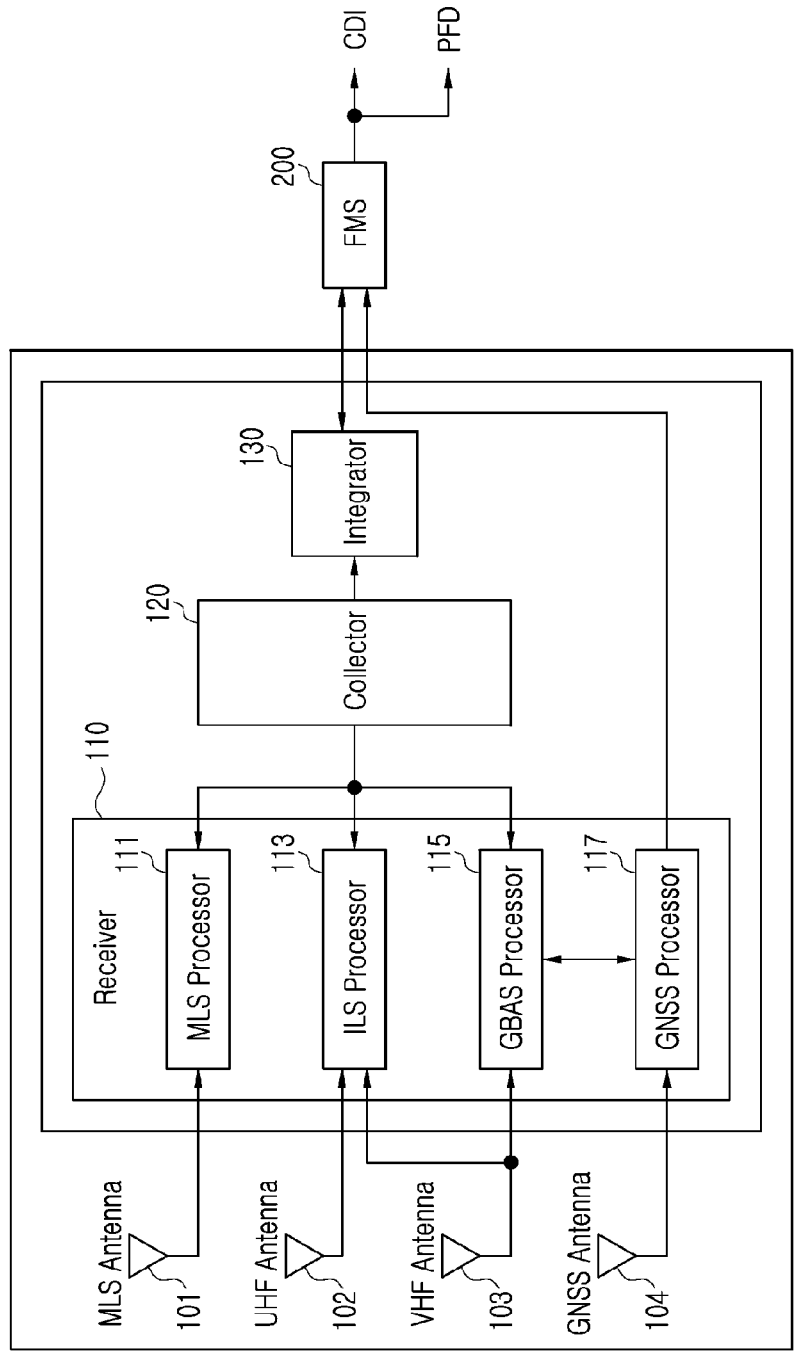
FIG. 4 is a block diagram illustrating a constitution of an integrated landing receiver for the landing of an aircraft, according to an exemplary embodiment.

FIG. 4 is a block diagram illustrating a constitution of an integrated landing receiver for the landing of an aircraft, according to an exemplary embodiment.

Referring to FIG. 4, the integrated landing receiver according to an exemplary embodiment includes a receiver 110, a collector 120, and an integrator 130. Further, the integrated landing receiver may include an MLS antenna 101, an UHF antenna 102, a VHF antenna 103, and a GNSS antenna 104, and depending on exemplary embodiments, may be externally mounted separately from the integrated landing receiver.

The MLS antenna 101 may receive signals in the microwave frequency (5~5.25 GHz) band, and can receive signals broadcast from the MLS ground equipment installed at the airport.

The UHF antenna 102 may receive signals in the UHF frequency (300 MHz~3 GHz) band, and can receive signals from the glide slope among the ILS ground equipment installed at the airport.

The VHF antenna 103 may receive signals in the VHF frequency (30~300 MHz) band, and can receive signals such as signals from the localizer among the ILS ground equipment, the marker beacon signals, and the GBAS VHF data broadcast (VDB) signals.

The GNSS antenna 104 may receive GPS signals from a GPS satellite.

The receiver 110 may include a plurality of signal information processors 111, 113, 115, 117 to generate landing guidance information corresponding to a plurality of landing support facilities, respectively. More specifically, the receiver 110 may include a part or all of the MLS processor 111, the ILS processor 113, the GBAS processor 15, and the GNSS processor 117.

The MLS processor 111 may receive the MLS signals from the MLS antenna 101, generate the lateral deviation and the vertical deviation of the aircraft, and a distance between aircraft and runway threshold, and transmit the same to the collector 120.

The ILS processor 113 may receive the glide slope signals and the localizer signals of the ILS respectively from the UHF antenna 102 and the VHF antenna 103, and generate lateral deviation and vertical deviation of the aircraft. Further, the ILS processor 113 may generate marker beacon reception information (that is, signals indicating whether marker beacon signals are received or not) by using the marker beacon signals received at the VHF antenna 103. The ILS processor 113 may transmit the generated information to the collector 120.

The GBAS processor 115 may receive the VHF data broadcast (VDB) signals of the GBAS ground equipment from the VHF antenna 103, and receive the GBAS navigation information of the aircraft from the GNSS processor 117, and generate the lateral deviation and the vertical deviation of the aircraft, and the distance between aircraft and runway threshold. The GBAS processor 115 may transmit the generated GBAS landing guidance information to the collector 120.

The GNSS processor 117 may receive the GBAS VDB signals from the GBAS processor 115, receive the GPS satellite signals from the GNSS antenna 104, simultaneously generate the aircraft navigation information using the GPS satellite signals only, and the aircraft GBAS navigation information using both the GBAS VDB signals and GPS satellite signals, and then transmit the same to the FMS 200.

The collector 120 performs a function of collecting the landing guidance information generated at each of a plurality of signal information processors 111, 113, 115, 117, and transmitting the collected information to the integrator 130.

Depending on exemplary embodiments, information such as antenna output intensity of the ground equipment antennas, antenna gains, antenna frequencies, ILS localizer signal sensitivity of the VHF antenna provided in the integrated landing receiver, the glide slope signal sensitivity of the UHF antenna, MLS antenna signal sensitivity, and so on may be obtained through components separately provided in addition to a plurality of signal information processors 111, 113, 115, 117 and the collector 120, and provided to the integrator 130.

Figure 5:
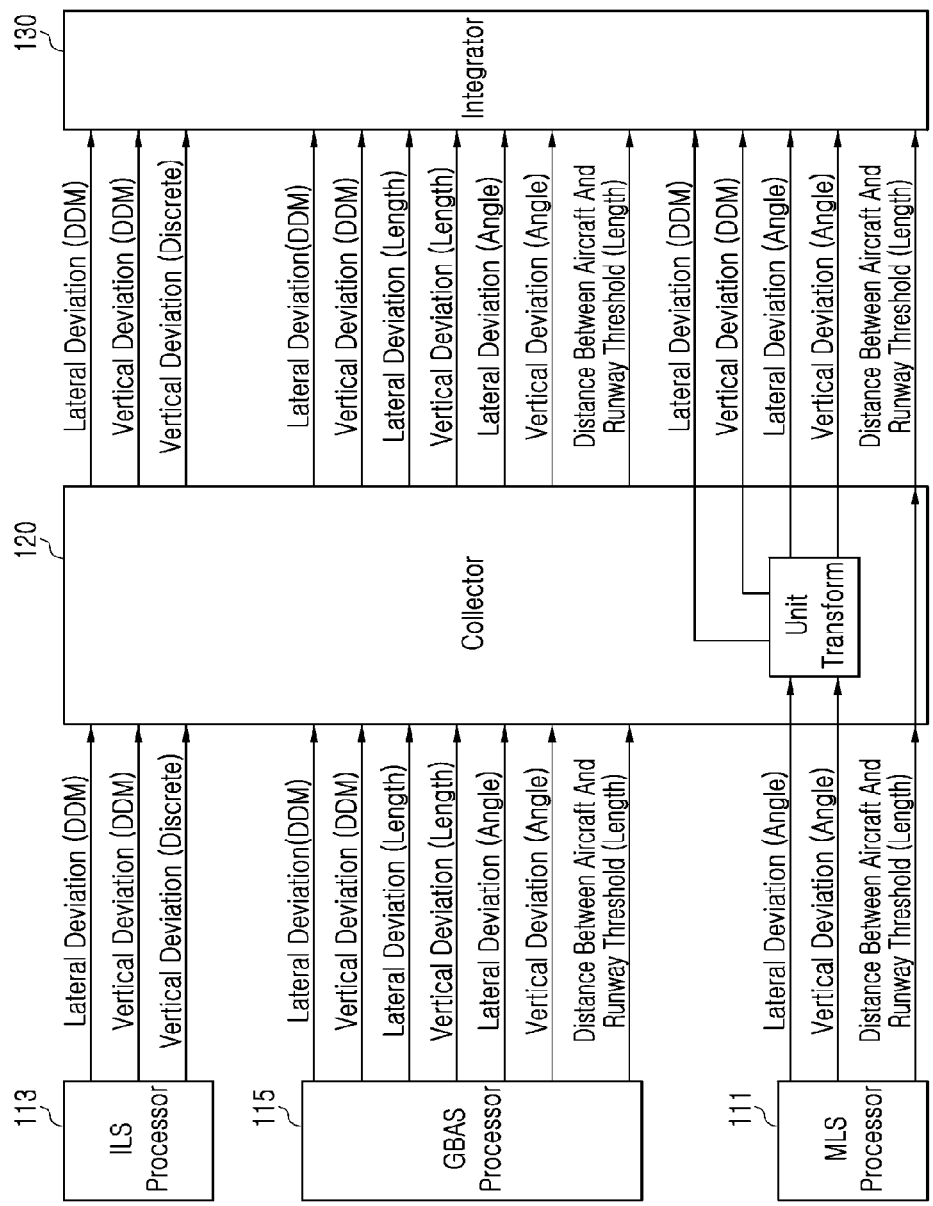
FIG. 5 is a view provided to explain landing guidance information being generated from a plurality of signal information processors and collected at a collector, and the collected landing guidance information being transmitted to an integrator, according to an exemplary embodiment.

FIG. 5 is a view provided to explain landing guidance information being generated from a plurality of signal information processors and collected at a collector, and the collected landing guidance information being transmitted to an integrator, according to an exemplary embodiment.

Referring to FIG. 5, the collector 120 transforms the values of the lateral deviation and vertical deviation of the aircraft provided in an angular unit from the MLS processor 111 into the difference in depth of modulation (DDM) unit and outputs the result. Of course, the landing guidance information generated from each of a plurality of signal information processors 111, 113, 115, 117 may be directly transmitted to the integrator 130.

The conversion at the collector 120 of the values of the MLS lateral deviation and vertical deviation from angular unit into DDM unit may be achieved by the equation below. The lateral deviation in angular unit may be transformed into DDM unit by using equations 1 and 2, and the vertical deviation in angular unit may be transformed by using equation 3.

$$Lat_{DDM} = 0.155 \frac{\alpha_{lat}}{\alpha_{lat,FS}}$$ [Equation 1]

$$\alpha_{lat,FS} = \tan^{-1}\left(\frac{CW}{D_G}\right)$$ [Equation 2]

$$Vert_{DDM} = \frac{0.175 \cdot \alpha_v}{0.25 \cdot GPA}$$ [Equation 3]

where, CW (Course Width) denotes a course width value measured at a threshold of the runway, and it is a fixed already-known value designated for each of the runways of each airport. $D_G$ denotes a distance from runway threshold (LTP/FTP) to a location at which MLS azimuth facility is installed. $\alpha_{lat}$ denotes an MLS angular unit lateral deviation, and $\alpha_v$ is an MLS angular unit vertical deviation. GPA is a fixed already-known value of a runway glide angle that is designated per runway of each airport.

The integrator 130 performs a function of generating integrated landing guidance information using the landing guidance information collected at the collector 120 and outputting the result.

Figure 6:
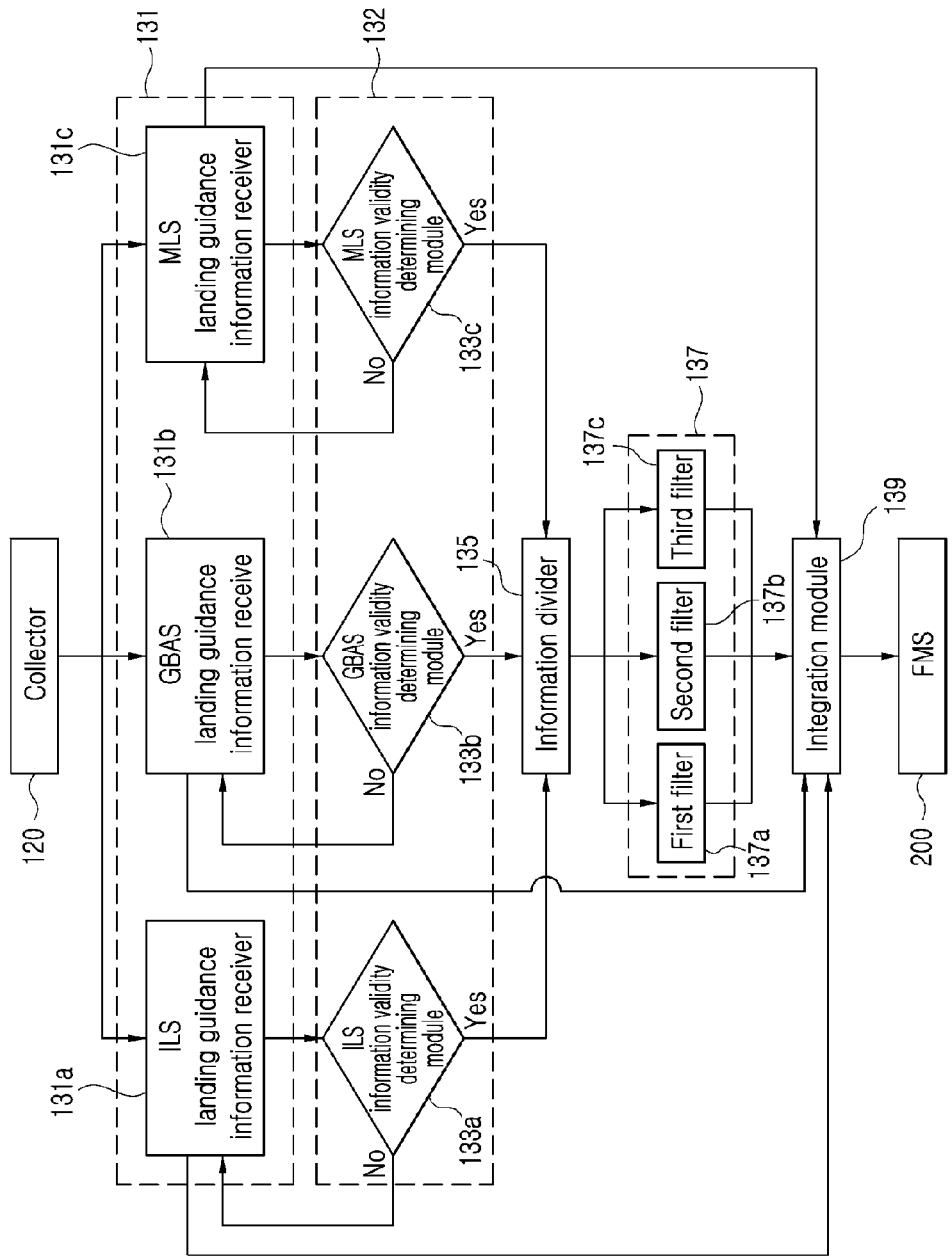
FIG. 6 is a block diagram illustrating in detail a constitution of an integrator according to an exemplary embodiment.

FIG. 6 is a block diagram illustrating in detail a constitution of an integrator according to an exemplary embodiment.

Referring to FIG. 6, the integrator 130 may include a landing guidance information receiver 131, a validity determiner 133, an information divider 135, a filter 137, and an integration module 139.

The landing guidance information receiver 131 may include an ILS landing guidance information receiver 131a, a GBAS landing guidance information receiver 131b, and an MLS landing guidance information receiver 131c.

The validity determiner 133 may include an ILS information validity determining module 133a, a GBAS information validity determining module 133b, and an MLS information validity determining module 133c.

The filter 137 may include a first filter 137a, a second filter 137b, and a third filter 137c The ILS landing guidance information receiver 131a may receive ILS landing guidance information from the collector 120, and transmit the received information to the ILS information validity determining module 133a and the integration module 139.

The ILS information validity determining module 133a may receive from the ILS landing guidance information receiver 131a ILS lateral deviation and ILS vertical deviation information in DDM unit included in the ILS landing guidance information, and determines the validity of the received information. The ILS information validity determining module 133a transmits the information to the information divider 135 when the ILS lateral deviation and the ILS vertical deviation are valid, and if not, notifies it to the ILS landing guidance information receiver 131a.

The GBAs landing guidance information receiver 131b may receive the GBAS landing guidance information from the collector 120, and transmit the received information to the GBAS information validity determining module 133b and the integration module 139.

The GBAS information validity determining module 133b receives from the GBAS landing guidance information receiver 131b GBAS lateral deviation and GBAS vertical deviation in DDM unit, and distance between aircraft and runway threshold in length unit included in the GBAS landing guidance information, and determines validity thereof. When determining that the GBAS lateral deviation, the GBAS vertical deviation, and the distance between aircraft and runway threshold are valid, the GBAS information validity determining module 133b transmits the information to the information divider 135, and if not, notifies it to the GBAS landing guidance information receiver 131b.

The MLS information validity determining module 133c receives from the MLS landing guidance information receiver 131c MLS lateral deviation and MLS vertical deviation in DDM unit, and distance between aircraft and runway threshold in length unit included in the MLS landing guidance information, and determines validity thereof.

The information divider 135 transmits the information determined to be valid at the ILS information validity determining module 133a, the GBAS information validity determining module 133b, and the MLS information validity determining module 133c and transmitted therefrom, i.e., the ILS lateral deviation, the GBAS lateral deviation, the MLS lateral deviation, the ILS vertical deviation, the GBAS vertical deviation, and the MLS vertical deviation in DDM unit, and distance between aircraft and runway threshold in GBAS distance unit, and the distance between aircraft and runway threshold in MLS distance unit, to the filter 137.

More specifically, the information divider 135 transmits the lateral deviation information in DDM unit to the first filter 137a, transmits the vertical deviation information in DDM unit to the second filter 137b, and transmits distance between aircraft and runway threshold to the third filter 137c.

The first filter 137a may calculate integrated lateral deviation information that mixes the ILS lateral deviation, the GBAS lateral deviation, and the MLS lateral deviation, while giving higher weight on the deviation information from the landing support facility with higher accuracy of deviation information through a proper filter (e.g., Kalman filter, Least Square, and so on). The general understanding is that the accuracy is higher in the order of GBAS, MLS, and ILS, and weights may be given differently according to such order.

The second filter 137b may calculate integrated vertical deviation information that mixes the ILS vertical deviation, the GBAS vertical deviation, and the MLS vertical deviation, while giving higher weight on the deviation information from the landing support facility with higher accuracy of deviation information through a proper filter (e.g., Kalman filter, Least Square, and so on). The general understanding is that the accuracy is higher in the order of GBAS, MLS, and ILS, and weights may be given differently according to such order.

The third filter 137c may calculate integrated distance that mixes the GBAS and MLS distances between aircraft and runway threshold, while giving higher weight on the distance information from the landing support facility with higher accuracy of information through a proper filter (e.g., Kalman filter, Least Square, and so on). The general understanding is that the accuracy is higher in the order of GBAS and MLS, and weights may be given differently according to such order.

When valid lateral deviation information is transmitted for all of ILS, MLS, and GBAS, the first filter 137a may generate: 1) ILS/MLS integrated lateral information; 2) MLS/GBAS integrated lateral deviation information; 3) ILS/GBAS integrated lateral deviation information; and 4) ILS/MLS/GBAS integrated lateral deviation information. Further, when the valid lateral deviation information is transmitted for only two of the ILS, MLS, and GBAS transmit, the first filter 137a may generate, using corresponding valid lateral deviation information, one of: 1) ILS/MLS integrated lateral deviation information; 2) MLS/GBAS integrated lateral deviation information; and 3) ILS/GBAS integrated lateral deviation information. That is, when the valid information is transmitted only for the ILS and MLS lateral deviations, only the 1) ILS/MLS integrated lateral deviation information may be generated.

The second filter 137b may also generate the integrated vertical deviation information in the same manner as the first filter 137a.

The third filter 137c may output the MLS distance between aircraft and runway threshold as is when the valid landing guidance information is transmitted only for MLS, and output the GBAS distance between aircraft and runway threshold as is when the valid landing guidance information is transmitted only for GBAS. Of course, when the valid landing guidance information is transmitted for both MLS and GBAS, then the third filter 137c mixes the MLS and GBAS distances between aircraft and runway threshold and outputs the result.

The filtering algorithm that is commonly applicable to the first filter 137a, the second filter 137b, and the third filter 137c will now be described in detail with reference to Equation 4.

$$\text{Filtered\_out}(t) = wf \times \text{Low\_Accuracy\_input}(t) + (1-wf) \times \text{High\_Accuracy\_input}(t) \quad [\text{Equation 4}]$$

where, $wf = 1 - (L_{fs}/L_{max})$, $L_{max} = P_t + G_{tot} - R$, $P_t$: antenna output intensity of a ground equipment corresponding to Low_Accuracy_input (unit: dBm), $G_{tot}$: antenna gain of a ground equipment corresponding to Low_Accuracy_input (that is, antenna amplitude: dBm), R: antenna signal sensitivity of a receiver ('receiver sensitivity') (dBm) for antenna signals from a ground equipment corresponding to Low_Accuracy_input (dBm) (that is, antenna sensitivity of an integrated landing receiver for a corresponding antenna), $L_{fs} = 32.45 + 20 \log_{10}(d_{km}) + 20 \log_{10}(f_{MHz})$.

$f_{MHz}$: antenna frequency of a ground equipment corresponding to Low_Accuracy_input, and $d_{km}$: distance between aircraft and runway threshold Equation 4 expresses processing two pieces of input information (Low_Accuracy_input, High_Accuracy_input) with a weight (wf) and outputting (Filtered_out) the result.

The 'Low_Accuracy_input' refers to input information that is evaluated to have less accuracy than 'High_Accuracy_input'. It is generally understood that GBAS has the highest accuracy, followed by MLS, and then ILS that has a relatively lower accuracy than the others. Accordingly, when GBAS and MLS input information are inputted, the GBAS may be processed as 'High_Accuracy_input', while the MLS may be processed as 'Low_Accuracy_input'.

Meanwhile, when all of three inputs, i.e., GBAS, MLS, and ILS are inputted, first, the GBAS may be processed as 'High_Accuracy_input', then the ILS may be processed as 'Low_Accuracy_input', and then the processed result may be processed as 'High_Accuracy_input' and the MLS may be processed as 'Low_Accuracy_input'.

To explain more about the algorithm expressed by Equation 4 with reference to GBAS and ILS, regardless of the distance between aircraft and airport (i.e., landing runway), the GBAS provides constant information including vertical/lateral deviation, and so on within about ±1 m, whereas the ILS has an increasing error of vertical/lateral deviations, and so on, as the aircraft is farther away from the airport. This is because the ILS calculates the vertical/lateral deviations with analogue signals broadcast from the airport and the intensity of the analogue signals become weaker as the distance from the airport increases, in which case the signals have noises and signal interferences are occurred. Therefore, considering the above, the signal loss of the radio wave signals in free space may be applied to the weight of the filter so that the information from the landing support facility with higher accuracy is processed to be more weighted.

Examples of applying Equation 4 to the first filter 137a, the second filter 137b, and the third filter 137c will be described in detail below.

*When Applying Filter on First Filer* a) when there is only one valid input: when lateral deviation information is inputted from one of GBAS, MLS, and ILS, the input information is passed as is, i.e., without being separately filtered.

b) when there are two valid inputs: GBAS/ILS, GBAS/MLS, MLS/ILS
  i) when GBAS/ILS are inputted
  $P_t$: antenna output intensity of an ILS localizer antenna installed at airport
  $G_{tot}$: antenna gain of an ILS localizer antenna installed at airport
  R: ILS localizer signal receive sensitivity of a VHF antenna of an integrated landing receiver
  $f_{MHz}$, ILS localizer antenna frequency
  $d_{km}$: distance between aircraft and runway threshold
  ii) GBAS/MLS
  $P_t$ antenna output intensity of an MLS antenna installed at airport
  $G_{tot}$: antenna gain of an MLS antenna installed at airport
  R: MLS antenna signal receive sensitivity of an integrated landing receiver
  $f_{MHz}$: MLS antenna frequency
  $d_{km}$: distance between aircraft and runway threshold
  iii) MLS/ILS
  $P_t$: antenna output intensity of an ILS localizer antenna installed at airport
  $G_{tot}$: antenna gain of an ILS localizer antenna installed at airport
  R: ILS localizer signal receive sensitivity of a VHF antenna of an integrated landing receiver
  $f_{MHz}$: ILS localizer antenna frequency
  $d_{km}$: distance between aircraft and runway threshold c) when there are three valid inputs: GBAS/ILS/MLS
  when all of three inputs are valid, first, filtering is performed based on an example in which GBAS and ILS are inputted, and then the following values are applied when the filtered GBAS/ILS values, and MLS are filtered again.
  $P_t$ antenna output intensity of an MLS antenna installed at airport
  $G_{tot}$: antenna gain of an MLS antenna installed at airport
  R: MLS antenna signal receive sensitivity of an integrated landing receiver
  $f_{MHz}$: MLS antenna frequency
  $d_{km}$: distance between aircraft and runway threshold

*When Applying Filter on Second Filter* a) when there is only one valid: when vertical deviation information is inputted from one of GBAS, MLS and ILS, the input information is passed as is, i.e., without being separately filtered.

b) when there are two valid inputs: GBAS/ILS, GBAS/MLS, MLS/ILS
  i) when GBAS/ILS are inputted
  $P_t$: antenna output intensity of an ILS glide slope antenna installed at airport
  $G_{tot}$: antenna gain of an ILS glide slope antenna installed at airport
  R: ILS glide slope signal receive sensitivity of UHF antenna of an integrated landing receiver
  $f_{MHz}$: ILS glide slope antenna frequency
  $d_{km}$: distance between aircraft and runway threshold
  ii) GBAS/MLS
  $P_t$: antenna output intensity of an MLS antenna installed at airport
  $G_{tot}$: antenna gain of an MLS antenna installed at airport
  R: MLS antenna signal receive sensitivity of an integrated landing receiver
  $f_{MHz}$: MLS antenna frequency
  $d_{km}$: distance between aircraft and runway threshold
  iii) MLS/ILS
  $P_t$: antenna output intensity of an ILS glide slope antenna installed at airport
  $G_{tot}$: antenna gain of an ILS glide slope antenna installed at airport
  R: ILS glide slope signal receive sensitivity of UHF antenna of an integrated landing receiver
  $f_{MHz}$: ILS glide slope antenna frequency
  $d_{km}$: distance between aircraft and runway threshold c) when there are three valid inputs: GBAS/ILS/MLS
  when all of three inputs are valid, first, filtering is performed based on an example in which GBAS and ILS are inputted, and then the following values are applied when the filtered GBAS/ILS values, and MLS are filtered again.
  $P_t$ antenna output intensity of an MLS antenna installed at airport
  $G_{tot}$: antenna gain of an MLS antenna installed at airport
  R: MLS antenna signal sensitivity of an integrated landing receiver
  $f_{MHz}$: MLS antenna frequency
  $d_{km}$: distance between aircraft and runway threshold

*Applying Filter on Third Filter* a) when there is only one valid: when information including distance between aircraft and runway threshold is inputted from one of GBAS and MLS, the input information is passed as is, i.e., without being separately filtered.

b) when there are two valid inputs: GBAS/MLS
  i) GBAS/MLS
  $P_t$: antenna output intensity of an MLS antenna installed at airport
  $G_{tot}$: antenna gain of an MLS antenna installed at airport
  R: MLS antenna signal receive sensitivity of an integrated landing receiver
  $f_{MHz}$: MLS antenna frequency
  $d_{km}$: MLS distance between aircraft and runway threshold The distances between aircraft and runway threshold used in the first filter 137a and the second filter 137b described above may preferably use the information about the distance between aircraft and runway threshold outputted from the third filter 137c.

The integration module 139 may provide the landing guidance information of the respective landing support facilities as this is received from the ILS landing guidance information receiver 131a, the GBAS landing guidance information receiver 131b, and the MLS landing guidance information receiver 131c, and the integrated landing guidance information transmitted from the filter 137, to the flight management system (FMS) 200.

Accordingly, the integration module 139 may provide the non-mixed landing guidance information (i.e., ILS lading guidance information, MLS landing guidance information, GBAS landing guidance information) of the respective landing support facilities, and the mixed integrated landing guidance information (ILS/MLS integrated landing guidance information, ILS/GBAS integrated landing guidance information, MLS/GBAS integrated landing guidance information, and ILS/MLS/GBAS integrated landing guidance information), to the flight management system (FMS) 200.

Of course, the integration module 139 may be realized so as to provide the non-mixed landing guidance information and the mixed integrated landing guidance information to an apparatus other than the FMS 200 exemplified in the exemplary embodiment described herein.

Meanwhile, the FMS 200 may provide the non-mixed landing guidance information and the mixed integrated landing guidance information to a pilot through a primary flight display (PFD), course deviation indicator (CDI), and so on.

Exemplary embodiments of the present disclosure include a computer-readable medium including program instructions to perform operations implemented on a variety of computers. The medium records programs to implement a controlling method of an integrated landing receiver for the landing of an aircraft descried above. The medium may include program instruction, data file, data structure, and so on, either alone or in combination. An example of such medium includes a magnetic medium such as hard disk, floppy disk, and magnetic tape, an optical recording medium such as CD and DVD, a magneto-optical medium such as floptical disk, hardware device configured to store and implement program instructions such as ROM, RAM, flash memory, and so on. Alternatively, such medium may be a transmission medium such as light, optical or metal line, waveguide, and so on, including carrier wave transmitting signals designating program instructions, data structures, and so on. Examples of the program instructions include not only machine codes as generated by a compiler, but also high-level language codes implementable on a computer by using interpreter, and so on.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An integrated landing receiver for landing of an aircraft, comprising:
  a receiver comprising a plurality of signal information processors configured to generate landing guidance information respectively corresponding to a plurality of landing support facilities;
  a collector configured to collect the landing guidance information respectively generated at the plurality of signal information processors; and
  an integrator configured to generate integrated landing guidance information by using the landing guidance information collected at the collector and output the result,
  wherein the integrator comprises:
    a validity determiner configured to determine validity of information including lateral deviation, vertical deviation, and distance between aircraft and runway threshold included in the landing guidance information respectively collected at the plurality of signal information processors; and
    a filter configured to output information including integrated lateral deviation, integrated vertical deviation, and integrated distance between aircraft and runway threshold, calculated by applying a weight according to the landing support facilities with respect to the information including the lateral deviation, the vertical deviation, and the distance between aircraft and runway threshold determined to be valid at the validity determiner,
  wherein the filter outputs information including the integrated lateral deviation, the integrated vertical deviation, and the integrated distance between aircraft and runway threshold, calculated by applying the weight according to the landing support facilities with respect to the information including the lateral deviation, the vertical deviation, and the distance between aircraft and runway threshold determined to be valid, based on an equation below:

$$\text{Filtered\_out}(t) = wf \times \text{Low\_Accuracy\_input}(t) + (1-wf) \times \text{High\_Accuracy\_input}(t) \quad [\text{Equation}]$$

where, $wf = 1 - (L_{fs}/L_{max})$, $L_{max} = P_t + G_{tot} - R$, $P_t$: antenna output intensity of a ground equipment corresponding to Low_Accuracy_input (unit: dBm), $G_{tot}$: antenna gain of a ground equipment corresponding to Low_Accuracy_input (that is, antenna amplitude: dBm), R: receiver sensitivity (dBm) of an antenna provided at the integrated landing receiver that receives antenna signals from a ground equipment corresponding to Low_Accuracy_input (dBm), $L_{fs} = 32.45 + 20\text{Log}_{10}(d_{km}) + 20\text{Log}_{10}(f_{MHz})$, $f_{MHz}$: antenna frequency of a ground equipment corresponding to Low_Accuracy_input, $d_{km}$: distance between aircraft and runway threshold,
  wherein the Equation expresses processing two pieces of input information, i.e., Low_Accuracy_input and High_Accuracy_input with a weight (wf) and outputting (Filtered_out) the result,
  the 'Low_Accuracy_input' refers to input information that is evaluated to have less accuracy than 'Low_Accuracy_input',
  the plurality of landing support facilities comprise at least two of Instrument Landing System (ILS), Ground-based Augmentation System (GBAS), and Microwave Landing System (MLS), and
  the GBAS, MLS, and ILS are evaluated to have a higher accuracy in order and processed in such order, and when valid information is inputted from all of the GBAS, MLS, and ILS, the GBAS and ILS input information is first processed by the Equation above, and then the result of such processing and the MLS input information are again processed by the Equation above.

2. The integrated landing receiver of claim 1, wherein the integrator outputs the landing guidance information respectively generated at the plurality of signal information processors, and the information including the integrated lateral deviation, the integrated vertical deviation, and the integrated distance between aircraft and runway threshold together.

3. The integrated landing receiver of claim 2, wherein the plurality of landing support facilities comprise at least two of Instrument Landing System (ILS), Ground-based Augmentation System (GBAS), and Microwave Landing System (MLS), and
  the plurality of signal information processors comprise at least two of an ILS signal processor, a GBAS signal processor, and an MLS signal processor.

4. The integrated landing receiver of claim 3, wherein the collector transforms MLS lateral deviation and MLS vertical deviation included in the landing guidance information generated at the MLS signal processor into a DDM (difference in depth of modulation) unit and outputs the result.

5. A controlling method of an integrated landing receiver for landing of an aircraft, comprising:
generating landing guidance information respectively corresponding to a plurality of landing support facilities;
collecting the generated landing guidance information respectively corresponding to the plurality of landing support facilities; and
generating integrated landing guidance information by using the collected landing guidance and outputting the result,
wherein the generating the integrated landing guidance information and outputting the result comprises:
determining validity of information including lateral deviation, vertical deviation, and distance between aircraft and runway threshold included in the collected landing guidance information; and
outputting information including integrated lateral deviation, integrated vertical deviation, and integrated distance between aircraft and runway threshold, calculated by applying a weight according to the landing support facilities with respect to the information including the lateral deviation, the vertical deviation, and the distance between aircraft and runway threshold determined to be valid among the collected landing guidance information,
outputting information including the integrated lateral deviation, the integrated vertical deviation, and the integrated distance between aircraft and runway threshold, calculated by applying the weight according to the landing support facilities with respect to the information including the lateral deviation, the vertical deviation, and the distance between aircraft and runway threshold determined to be valid, based on an equation below:

$$\text{Filtered\_out}(t)=wf \times \text{Low\_Accuracy\_input}(t)+(1-wf)^{*}\text{High\_Accuracy\_input}(t) \quad \text{[Equation]}$$

where, $wf=1-(L_{fs}/L_{max})$, $L_{max}=P_t+G_{tot}-R$, $P_t$: antenna output intensity of a ground equipment corresponding to Low_Accuracy_input (unit: dBm), $G_{tot}$: antenna gain of a ground equipment corresponding to Low_Accuracy_input (that is, antenna amplitude: dBm), R: receiver sensitivity (dBm) of an antenna provided at the integrated landing receiver that receives antenna signals from a ground equipment corresponding to Low_Accuracy_input (dBm), $L_{fs}=32.45+20\text{Log}_{10}(d_{km})+20\text{Log}_{10}(f_{MHz})$, $f_{MHz}$: antenna frequency of a ground equipment corresponding to Low_Accuracy_input, and $d_{km}$: distance between aircraft and runway threshold,
wherein the Equation expresses processing two pieces of input information, being Low_Accuracy_input and High_Accuracy_input with a weight (wf) and outputting (Filtered_out) the result,
the 'Low_Accuracy_input' refers to input information that is evaluated to have less accuracy than 'High_Accuracy_input',
the plurality of landing support facilities comprise at least two of Instrument Landing System (ILS), Ground-based Augmentation System (GBAS), and Microwave Landing System (MLS), and
the GBAS, MLS, and ILS are evaluated to have a higher accuracy in order and processed in such order, and when valid information is inputted from all of the GBAS, MLS, and ILS, the GBAS and ILS input information is first processed by the Equation above, and then the result of such processing and the MLS input information are again processed by the Equation above.

6. The controlling method of claim 5, wherein the generating the integrated landing guidance information and outputting the result comprises outputting the landing guidance information respectively generated correspondingly to the plurality of landing support facilities, and the information including the integrated lateral deviation, the integrated vertical deviation, and the integrated distance between aircraft and runway threshold together.

7. The controlling method of claim 6, wherein the plurality of landing support facilities comprise at least two of Instrument Landing System (ILS), Ground-based Augmentation System (GBAS), and Microwave Landing System (MLS), and
the landing guidance information respectively corresponding to the plurality of landing support facilities is generated from at least two of an ILS signal processor, a GBAS signal processor, and an MLS signal processor.

8. The controlling method of claim 7, wherein, in the collecting the landing guidance information, MLS lateral deviation and MLS vertical deviation included in the landing guidance information generated at the MLS signal processor is transformed into a DDM (difference in depth of modulation) unit.

9. A computer-readable medium recording a program to implement the controlling method of any of claims 5 to 8 on a computer.

* * * * *